United States Patent
Bedard et al.

[15] 3,649,962
[45] Mar. 14, 1972

[54] VEHICLE ALARM SYSTEM

[72] Inventors: Peter R. Bedard, 4057 Pratt Avenue, Bronx, N.Y. 10466; Charles J. Spall, Jr., 152 South MacQuesten Parkway, Mount Vernon, N.Y. 10550

[22] Filed: Oct. 17, 1969

[21] Appl. No.: 867,309

[52] U.S. Cl....................................340/64, 340/63, 340/276
[51] Int. Cl...............................................................B60r 25/10
[58] Field of Search ................................340/64, 65, 63, 276

[56] References Cited

UNITED STATES PATENTS

| | | | |
|---|---|---|---|
| 1,568,509 | 1/1926 | Kolling et al............................340/64 |
| 3,329,935 | 7/1967 | Wiggins..................................340/63 |
| 3,531,793 | 9/1970 | Shottenfeld...........................340/276 |

*Primary Examiner*—Thomas B. Habecker
*Assistant Examiner*—Glen R. Swann, III
*Attorney*—John B. Dickman, III

[57] ABSTRACT

The invention provides a protective alarm system for a vehicle by sounding an alarm when the vehicle is tampered with or entered during the owner's absence. A first set of switches, including an inertia switch, is connected by a normal sensing relay to sound the alarm immediately if the vehicle is shaken or tampered with in other ways. A second set of switches is provided to set up an alarm condition by holding relay and a thermostatic delay relay if normal entry is gained to the vehicle, as by opening a door, but will not sound the alarm during a predetermined 15 second delay. Turning the ignition on during this 15 second entry period disables the entire alarm system by way of a de-activating relay and a further thermostatic delay relay. When the ignition switch is turned off the further delay relay provides a 120-second non-alarming period for exit from and locking of the vehicle.

7 Claims, 2 Drawing Figures

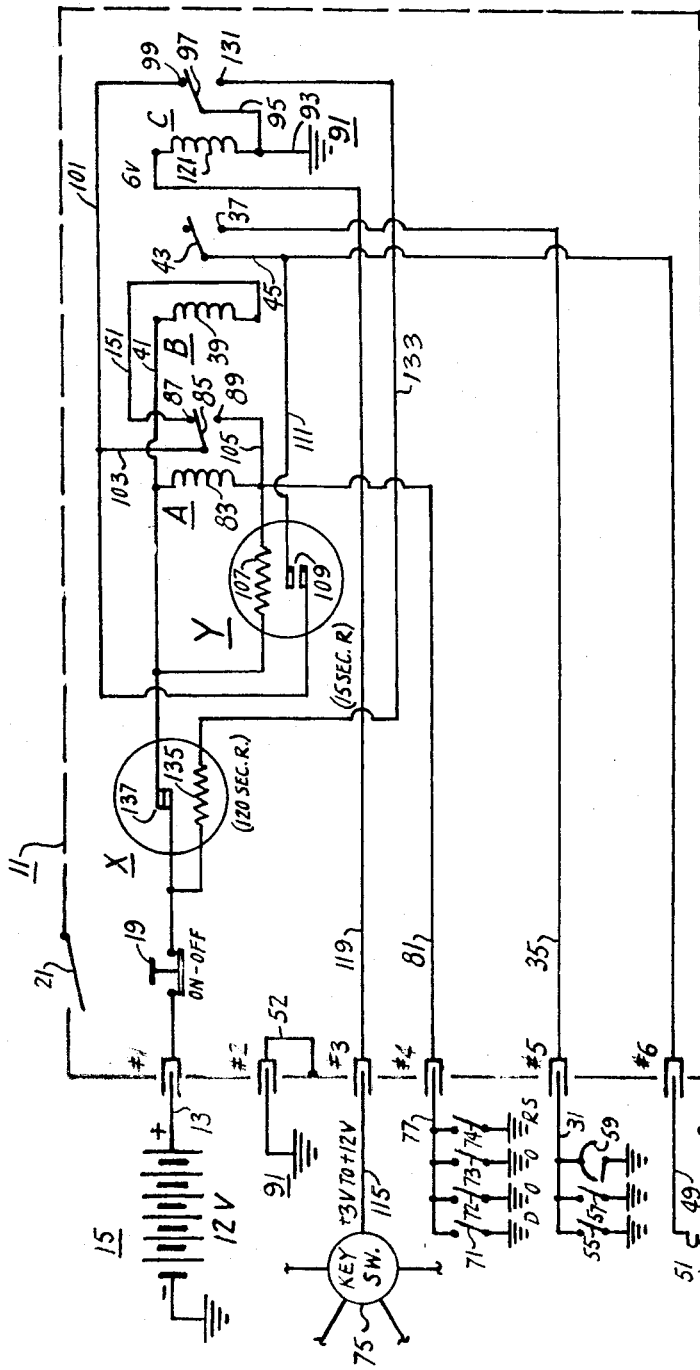
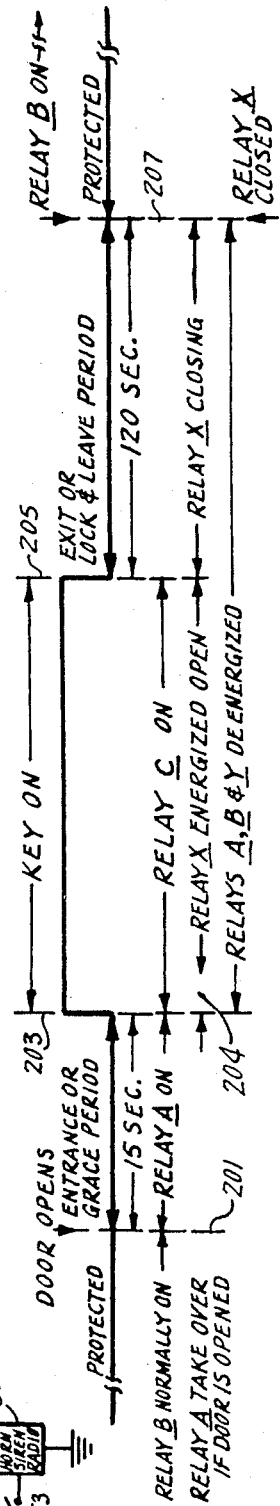
FIG. 1
FIG. 2
INVENTORS.
PETER R. BEDARD
CHARLES J. SPALL, Jr
BY John B. Dickman III
AGENT.

3,649,962

VEHICLE ALARM SYSTEM

BACKGROUND OF THE INVENTION

Various types of vehicle burglar alarm systems are known in the art. One such type of apparatus is provided with alarm actuating switches responsive to the opening of various doors, hood and trunk of an automobile. However, this type of device has the disadvantage of requiring a separate arming switch which must be activated by the operator after leaving the vehicle and deactivated on his return. This requirement for manual activation is disadvantageous in that the operator may forget to arm or disarm the system or a potential thief has only to observe the operator arming the system and will know how to disarm it, rendering the system useless.

Another prior art system incorporates an arming and disarming switch inside the vehicle but this system has the disadvantage of incorporating elaborate electronic control circuitry and requiring manual activation and deactivation via a control switch whenever the driver leaves or enters the vehicle. The use of the interior control switch may cause the system to be defeated as in the above described system in that a potential thief has only to note the operation of the arming switch to be apprised of how to avoid sounding an alarm while breaking into the vehicle.

The present invention overcomes the foregoing disadvantages in that the system may be left in an activated condition such that it requires no manual operation and will automatically provide an energized alarm system whenever the operator leaves the vehicle yet will allow him to re-enter without sounding an alarm.

SUMMARY OF THE INVENTION

The present invention provides an alarm circuit with built-in timing to permit normal entrance into and exit from the vehicle, as well as, use of the vehicle with the ignition key turned on—all without actuating the alarm. Otherwise, the vehicle is protected against tampering, abnormal entry, or even normal entry in the absence of turning the ignition switch on within the proper time period.

The operating circuitry is preferably contained in a box or housing which may be located beneath the dashboard or secreted in the glove compartment. It includes an energizing connection from the vehicle's electrical power supply which may be interrupted by a hidden manual switch to disable the alarm, thereby permitting servicing of the vehicle, or the like. The operating circuitry of the box is also connected to the ignition switch, to a first set of normal entry switches, to a set of external or tampering switches, and to an alarm which may even comprise the horn of the vehicle.

The tampering switches include an inertia switch, which is actuated by shaking or moving the car to an extent greater than would normally occur when the operator enters the vehicle and places the key in the ignition. The tampering switches also include, as desired, a hood switch, a trunk switch, and even window or other exterior switches. A sensing or normally operative relay establishes a path from the tampering switches to a relay for the horn or other signaling device. Thus, actuation of any one of the parallel connected tampering switches immediately energizes the alarm relay to sound the alarm. It is only discontinued when that tampering switch is de-actuated i.e., usually opened.

The second set of switches guard the normal entrances to the vehicle, and in cooperation with a holding relay switching device and an entrance delay switching device permits a grace or alarm free period of 15 seconds, between the time one of the normal entrance switches, usually a door switch, is actuated and the ignition switch is turned on. Turning the ignition on disables the entire alarm system. It will be appreciated that the 15-second grace period may be made longer or shorter by the selection of the particular thermostatic delay relay employed.

When the ignition switch is turned on, an alarm de-actuating relay is directly operated. It is a low voltage relay and will operate on 3 to 12 volts, which is available depending upon where the ballast and distributor points drop the voltage from the vehicle's supply system relative to the ignition connection.

This relay removes all internal grounds to de-actuate the 15-second delay relay, the holding relay, and the normal sensing relay. However, the de-actuating relay establishes a current path through a further or exit thermostatic delay relay which relieves the input power to the alarm circuit and assures that it is inoperative as long as the ignition switch is closed.

When the ignition is turned off, the de-actuating relay is de-energized and current to the exit delay relay is interrupted. This relay closes in 120 seconds (or some other desired predetermined period) to re-actuate the alarm system. The 120-second delay enables the passengers and driver to exit from the car and to lock the same before alarm protection is resumed.

With the foregoing in mind, it is an object of the invention to provide a low cost, but reliable, alarm system which can even be installed by the operator.

A further object is the provision of an alarm system which does not require conscious effort on the part of the driver but automatically copes with normal entrance and exit from the vehicle without alarming.

Another object of the invention is the provision of an alarm system operative from the vehicle electrical system incorporating the standard ignition switch without modification for automatic operation.

A still further object of the invention is an alarm system responsive to tampering conditions to alarm immediately, and in certain cases, to cease alarming if the condition is relieved, but to alarm after a predetermined time even if normal entrance is gained to the vehicle but the ignition switch is not turned on.

BRIEF DESCRIPTION OF THE DRAWINGS

The foregoing will be better understood from the following detailed description of the invention when taken in the light of the drawings wherein:

FIG. 1 is a circuit diagram showing the preferred embodiment of this invention, and FIG. 2 is a timing chart useful in clarifying the operation of the circuit of FIG. 1.

DESCRIPTION OF THE PREFERRED EMBODIMENT

In FIG. 1, a box or enclosure 11, for the operating circuit, is shown in broken outline, because in some situations the enclosure 11 may be unnecessary, particularly where a new car manufacturer incorporates the alarm during the manufacturing process.

If the box 11 is installed in an existing vehicle, it is only necessary to make the plug-in connections labeled number 1 through number 6 to render the device operative. Connection number 1 extends over an external lead 13 to the electrical vehicle supply system, shown as battery 15. It will be understood that vehicles may use either the positive or negative ground and that switches may be switched to an on or off position. The polarity may be reversed and the switches may be used to ground, apply B+ or relieve either, so long as all changes are made consistent with the principles herein described. Thus, when a switch or other component is actuated, it is moved to its other condition or position, i.e., either off to on, or on to off.

In FIG. 1, the positive lead 13 extends through bayonet or plug-in coupling 1 to a simple on-off switch 19, which may be of the single pole, single throw, or push button type. Switch 19 interrupts all power to the operating circuit and may be switched by the owner through secret access, as by panel 21 in box 11, or simply by gaining access to a hidden location of this switch. Operation of switch 19 disables the alarm and permits mechanics or others to service the car and drive test the same without any inadvertent alarming.

A first set or plurality of switches 55, 57, and 59 (herein termed tamper switches) has the individual switches connected in parallel by lead 31 which extends through coupling 5 to lead 35, which in turn connects to the normally closed terminal 37 of relay B. The coil 39 of relay B is normally energized over positive lead 41 during the time that the vehicle is to be protected. Thus, its armature or contact 43 is normally closed to the downward position, making contact with terminal 37. Therefore, lead 35 is extended via lead 45 to the number 6 coupling, and thence over lead 49 to supply ground to the alarm relay 51, in turn connected to the positive side of the vehicle electrical system at terminal 53.

Closure of any of the hood switch 55, trunk switch 57, or inertia switch 59 grounds alarm relay 51 to close its switch 61 and operate the alarm 63, which may comprise the horn of the vehicle, a police siren, or a radio transmitter with antenna 65. Obviously, a visual signaling device could be employed as alarm 63 or any combination of the devices could be used. It will now be appreciated that closing of any of the tamper switches 55, 57, or 59 immediately alarms.

On the other hand, the set of switches 71 through 74, called the normal entrance switches, are connected to permit a delay or grace period before sounding the alarm 63. Further, the operation of the key or ignition switch 75, during the grace period, prevents any alarming at all.

Common lead 77 parallels the switches 71–74 and also connects them to coupler 4 which extends over lead 81 to the relay A, shown as the holding relay coil 83. Coil 83 is connected to positive lead 41 and thus is operated whenever a door switch 71–74 is closed to supply ground. This action moves its armature 85 from upper contact 87 to lower contact 89, thereby extending ground, shown at 91, over leads 93 and 95, via armature 97 of relay C, its upper terminal 99 and leads 101 and 103 to lead 105, which sends current through the heating element 107 of the 15-second delay relay Y. This starts the grace period running at the end of which the contacts 109 of delay relay Y will close. Closure of contacts 109 connects ground from 91 over leads 93, 101, and 111 to common lead 45 extending to the alarm relay 51.

Under normal conditions, the driver will open a door, closing one of switches 71 through 74, and enter the car and then insert his key in key switch 75, which upon turning on the ignition establishes a 3- to 12-volt connection over lead 115, and by way of coupler 3 to lead 119 which energizes coil 121 of relay C to switch its armature 97 to lower terminal 131 thereby relieving the common ground 91, and applying it over the lead 133 to cause current flow in the heater element 135 of thermostatic delay relay X. In approximately 2 seconds, its armature 137 opens and disrupts power to the entire operating circuit, thereby preventing any alarming while the ignition switch remains on.

When the ignition switch 75 is turned off, relay C is rendered inoperative, but delay relay X requires 120 seconds to close its armature 137 and restore the protective alarm circuit to normal or protecting condition with relay B operative. The 120-second period permits the driver and passengers to exit from and lock the car without alarming.

It should also be noted, from FIG. 1, that relays A, B, and C all operate to the exclusion of all others. For example, when relay A became operative, it removed ground from relay B by disconnecting lead 151 to drop out relay B. Relay C drops out both relay A and B by operation of delay relay X. Further, the common ground 91 is obtained by grounding box 11 to the vehicle ground over lead 52 and coupling 2.

The foregoing is depicted in the time chart of FIG. 2 wherein during normal protection, to the left of the dotted line or time 201, relay B is normally on and relay A takes over only when a door is opened, as at time 201. The grace or entry period of up to 15 seconds is permitted without alarming provided the key is turned on as indicated at time line 203. During the time interval 203 to 205, while the key or ignition switch is on, it may be seen that relay C is operative, relay X is energized, except for the brief heating period 204, and relays A, B, and Y are de-energized. During the exit or lock and leave period, relay X is closing and if all doors are closed by the time 207, no alarming is encountered.

What is claimed is:

1. A vehicle alarm system operable from the vehicle electrical system to alarm when the ignition switch is off excluding periods immediately prior to and subsequent to the period when the ignition switch is on comprising in combination, at least one entrance switch means actuable by normal entry into the vehicle, normal entrance delay switching means, alarm signaling means, first switching means for actuating the normal entrance delay switching means in response to actuation of the entrance switch means, said normal entrance delay switching means actuating the alarm means after a predetermined delay, at least one tamper switch means, second switching means for actuating the alarm means in response to actuation of the tamper switch means, exit delay switching means for rendering inoperative the first switching means, the second switching means and the normal entrance delay switching means when actuated, and third switching means responsive to switching the ignition switch on to actuate the exit delay switching means, said exit delay switching means remaining actuated for a predetermined period of delay subsequent to the ignition switch being turned off.

2. The system of claim 1 wherein the entrance switching means comprise vehicle door switches actuable by opening a door.

3. The system of claim 1 wherein the tamper switch means comprises at least an inertia switch.

4. The system of claim 1 wherein the delay switching means comprise thermostatic delay relays.

5. The system of claim 1 wherein the first, second, and third switching means comprise relays.

6. An alarm system for use with a vehicle electrical system including its ignition switch comprising in combination a plurality of sensing switches connected in the alarm system and carried by the vehicle, alarm means, sensing relay switching means normally operative from the electrical system responsive to actuation of any of selected switches in said plurality to operate the alarm means, holding switching means connected to switches in said plurality other than the selected switches for operation upon actuation of any of said other switches, first delay switching means energized by the holding switching means when operative to operate the alarm means after a predetermined period only if the holding switching means is still operative, further delay switching means connected to prevent operation of the sensing relay switching means, the holding switching means and the first delay switching means when rendered operative, and deactuating switching means responsive to the ignition switch when on to operate the further delay switching means.

7. A vehicle alarm system operable from the vehicle electrical system to alarm when the ignition switch is off excluding the periods immediately prior and subsequent to the period when the ignition switch is on, comprising in combination at least one entrance switch means actuable by normal entry into the vehicle, a first electromagnetic relay responsive to said entrance switch means, said first electromagnetic relay including a coil, normally opened and normally closed contacts, a second electromagnetic relay responsive to the vehicle ignition switch, said second electromagnetic relay including normally opened and normally closed contacts, a first thermo relay including a heater and normally opened contacts, said thermostatic relay heater responsive to said normally opened contacts of said first electromagnetic relay and said normally open contacts of said second electromagnetic relay, an alarm means responsive to said first thermostatic relay normally opened contacts, a third electromagnetic relay responsive to said normally closed contacts of said first electromagnetic relay and said normally opened contacts of said second electromagnetic relay, said third electromagnetic relay including a coil and normally opened contacts, tamper switch means, first interconnection means for connecting said tamper switch means to said alarm means via said normally opened contacts of said third electromagnetic relay, a second thermostatic relay including a heater and normally closed contacts, said second thermostatic relay heater responsive to said normally opened contacts of said second electromagnetic relay, said coils of said first and said third electromagnetic relay responsive to said normally closed contacts of said second thermostatic relay, and manually operable switch means interconnectable between said heater and said normally closed contacts of said second thermostatic relay and the vehicle electrical system.

* * * * *